United States Patent
Sass et al.

(10) Patent No.: US 12,281,725 B2
(45) Date of Patent: Apr. 22, 2025

(54) METHOD FOR CONSTRUCTING A PIPELINE PORTION OF A PIPE SYSTEM, AND PIPELINE PORTION OF A PIPE SYSTEM IN A HEATING NETWORK

(71) Applicant: Technische Universität Darmstadt, Darmstadt (DE)

(72) Inventors: Ingo Sass, Bensheim (DE); Bastian Welsch, Oberstenfeld (DE); Markus Schedel, Ober-Ramstadt (DE); Julian Formhals, Berlin (DE)

(73) Assignee: Technische Universität Darmstadt, Darmstadt (DE)

( * ) Notice: Subject to any disclaimer, the term of this patent is extended or adjusted under 35 U.S.C. 154(b) by 164 days.

(21) Appl. No.: 17/798,289

(22) PCT Filed: Jan. 6, 2021

(86) PCT No.: PCT/EP2021/050139
§ 371 (c)(1),
(2) Date: Aug. 8, 2022

(87) PCT Pub. No.: WO2021/160349
PCT Pub. Date: Aug. 19, 2021

(65) Prior Publication Data
US 2023/0066528 A1 Mar. 2, 2023

(30) Foreign Application Priority Data
Feb. 10, 2020 (DE) .................... 10 2020 103 331.1

(51) Int. Cl.
*F16L 1/028* (2006.01)
*F16L 59/15* (2006.01)

(52) U.S. Cl.
CPC .............. *F16L 1/028* (2013.01); *F16L 59/15* (2013.01)

(58) Field of Classification Search
CPC ........... F16L 1/028; F16L 59/04; F16L 59/15
See application file for complete search history.

(56) References Cited

U.S. PATENT DOCUMENTS

| 3,675,432 A | * | 7/1972 | Keene | ..................... F16L 59/12 405/157 |
| 2018/0259196 A1 | | 9/2018 | Rosén | |

(Continued)

FOREIGN PATENT DOCUMENTS

| CN | 108240526 A | * | 7/2018 | ............. F16L 1/028 |
| DE | 2345777 A1 | * | 3/1975 | |

(Continued)

*Primary Examiner* — Frederick L Lagman
(74) *Attorney, Agent, or Firm* — Smartpat PLC

(57) ABSTRACT

In a method for setting up a pipeline section of a pipe system in a heat network, which is provided for transferring a heat transfer fluid between a heat provider and a heat consumer, the pipeline section is subdivided into segments in a segmentation step. A segment characteristic variable is determined for each segment based on a physical soil characteristic variable. The determined segment characteristic variables of two adjacent segments differ by more than a predefined segment characteristic variable difference value. In a bedding determination step, segment embedding of a pipeline segment, introduced in the trench in this segment, in a water-permeable segment bedding material is predefined for each segment such that a heat loss of the heat transfer fluid transferred in the pipeline segment, which is averaged over the segment and is based on a unit of length, is lower than a predefined heat loss limit value.

13 Claims, 2 Drawing Sheets

(56) References Cited

U.S. PATENT DOCUMENTS

2022/0018488 A1\* 1/2022 Rosén ..................... F16L 1/028
2022/0356672 A1\* 11/2022 Rosén ..................... F16L 59/04

FOREIGN PATENT DOCUMENTS

| DE | 2717489 A1 | \* | 10/1978 | | |
|----|------------|---|---------|---|---|
| DE | 3112175 A1 | \* | 10/1982 | | |
| DE | 29618888 U1 | | 12/1996 | | |
| DE | 10202186 C2 | | 3/2003 | | |
| EP | 1319898 B1 | | 10/2006 | | |
| EP | 3165831 A1 | | 5/2017 | | |
| KR | 20210046798 A | \* | 4/2021 | | |
| WO | WO-9418482 A1 | \* | 8/1994 | .............. | F16L 1/028 |

\* cited by examiner

METHOD FOR CONSTRUCTING A PIPELINE PORTION OF A PIPE SYSTEM, AND PIPELINE PORTION OF A PIPE SYSTEM IN A HEATING NETWORK

TECHNICAL FIELD

The disclosure relates to a method for constructing a pipeline portion of a pipe system in a heating network which is provided for transferring a heat transfer fluid between a heat supplier and at least one heat consumer.

BACKGROUND

A district heating system usually has a heat supplier that is connected to one or more heat consumers via a district heating network. With the heat supplier, for example a combined heat and power plant, heat is generated from suitable energy sources and introduced into a heat transfer fluid. While early district heating systems often used heated steam as the heat transfer fluid, most currently operating district heating systems use heated water as the heat transfer fluid. The district heating network connects the heat supplier to the one heat consumer or the several heat consumers, wherein the heat transfer fluid circulates in a closed pipe system of the district heating network and transfers heat from the heat supplier to the heat consumers. The district heat transferred from the heat supplier to the heat consumers is regularly used for a central thermal energy supply of several buildings. Such a district heating system can be operated in an energy-efficient and ecologically as well as economically sensible manner, provided that the heat generation in the central heat supplier can be carried out efficiently and the heat energy introduced into the heat transfer fluid can be transferred to the individual heat consumers in the district heating network without excessive heat losses. Often, heat energy that is otherwise hardly usable, such as waste heat from industrial production processes, can also be used with the heat supplier to heat the heat transfer fluid.

A heating network, which connects a heat supplier to the several heat consumers, is of great importance here. A heating network can be a district heating network or a local heating network. By using a heating network, a heated heat transfer fluid or also a cooled heat transfer fluid can be transferred from the heat supplier to one or more heat consumers. In the following explanations, mainly a district heating network and the transfer of heat energy using a heated heat transfer fluid will be discussed, wherein this is not to be understood as a limitation to a specific type of heating network or heat energy transfer. Comparatively high costs are often incurred for the construction of the heating network, so that the heating network is a significant cost factor in the economic assessment of a heating system and in particular a district heating system. In order to keep the loss of heat energy during the transfer from the central heat supplier to the various heat consumers as low as possible, a heating network regularly uses a thermally insulated pipe system laid underground. The pipe system in a pipeline portion of the heating network is regularly composed here of individual pipeline elements that are double-walled and have the best possible and most efficient thermal insulation. Suitable double-walled pipe system elements generally have an inner medium pipe and a jacket pipe concentrically surrounding the medium pipe, wherein suitable thermal insulation is arranged between the medium pipe and the jacket pipe. The medium pipe and the jacket pipe are made of a suitable plastics material or metal, wherein the jacket pipe is intended to provide mechanical protection against the loads that usually occur and that may act on the individual pipeline elements in a buried pipe system of a heating network. The thermal insulation can be, for example, a suitable plastics foam, wherein in many cases a polyurethane foam is used as thermal insulation.

The individual pipeline elements are usually elaborately produced composite pipes with correspondingly high production costs. The individual pipeline elements are produced as prefabricated bar stock and delivered to the excavated trench to be first embedded therein and then connected to each other. In the process, the individual pipeline elements must be connected to each other in a fluid-tight manner by complex laying and welding work in order to avoid undesirable leakage of the heat transfer fluid at the joints of the individual pipeline elements.

The high investment costs for the construction of such a pipe system of a heating network are a major obstacle in the development and construction of decentralised renewable heat supply systems. Here, a large share of the investment costs is due to the production and installation of the thermally insulated pipeline elements.

SUMMARY

A method for constructing a pipeline portion of a pipe system in a heating network which is provided for transferring a heat transfer fluid between a heat supplier and at least one heat consumer is disclosed. A trench extending over the pipeline portion is excavated in the pipeline portion. A pipeline extending over the pipeline portion is introduced into the trench for the transfer of the heat transfer fluid along the pipeline portion and is embedded in a bedding material surrounding the pipeline. The trench is subsequently backfilled with a backfill material.

It is an object of the present disclosure to configure the method for constructing a pipeline portion of a pipe system in a heating network in such a way that a pipeline portion can be produced as cost-effectively as possible and, at the same time, can be used cost-efficiently for transferring district heat in a heating network with the lowest possible heat losses.

This object is achieved in that, in a segmentation step, the pipeline portion is divided into several segments, wherein a segment parameter is determined for each segment on the basis of at least one soil physical parameter, and the determined segment parameters of two adjacent segments differ by more than a specified segment parameter difference value, and in that, in a bedding determination step, for each segment a segment embedding of a pipeline segment introduced into the trench in this segment in a water-permeable segment bedding material is specified in such a way that, within the segment, a length-unit-related heat loss, averaged over the segment, of the heat transfer fluid transferred in the pipeline segment is less than a specified heat loss limit value. The disclosure is based here on the finding that it is advantageous from both an ecological and an economic point of view to produce the pipeline in the pipeline portion from pipeline elements that can be produced and laid as cost-effectively as possible. Complex thermal insulation of the individual pipeline elements is not regarded here to be an essential measure and, in contrast to conventional heating networks, not even as the only measure to minimise heat loss during the transfer of the heat transfer fluid through the pipeline portion concerned. Rather, it is taken into account that conventionally, due to the soil physical conditions in individual segments within the pipeline portion, greater heat losses of an only slightly or even negligibly thermally insulated pipeline element are to be expected, while in other segments a soil surrounding the pipeline can favour and increase a thermal insulation caused by the bedding material surrounding the pipeline. A major cause of undesirable heat transport away from the pipeline is in many cases the soil water present in the soil, which leads to water movement in the soil surrounding the pipeline and also in the bedding material immediately surrounding the pipeline, and leads to undesirable convective heat transport away from the pipeline through the water movement.

For the purposes of the present disclosure, all materials for which the coefficient of permeability in the water-saturated state is greater than $1 \cdot 10^{-12}$ m/s in the operating state of the heating network are considered to be water-permeable.

Embedding the pipeline in a water-impermeable bedding material could significantly reduce or almost completely avoid heat loss through convection of the soil water, but is associated with considerable production costs and also places high demands on mechanical protection of the pipeline in the pipeline portion, since the pipeline repeatedly expands and contracts thermally during its intended use.

In the segmentation step, the pipeline portion can be divided into several segments, which preferably differ with regard to the hydraulic and thermal soil physical parameters such as, in particular, the soil water saturation, the suction stress-water content relationship, the permeability of the soil for fluids and, in particular, for liquids, or the heat capacity or rather the thermal conductivity of the soil. After dividing the pipeline portion into several segments, a segment embedding suitable for the segment concerned can then be determined for each segment and specified in such a way that, using a suitable segment bedding material for the segment concerned, which material usually has the lowest possible water permeability, and depending on the soil physical conditions, the lowest possible heat loss averaged over the segment is achieved and is in any case lower than a specified heat loss limit value. Accordingly, the thermal insulation of the pipeline laid in the pipeline portion concerned is not achieved by using double-walled pipeline elements that are as thermally insulated as possible, but by the most skillful selection possible of a segment bedding material which can be produced as cost-effectively as possible and in which the pipeline element is embedded and which assumes the function of thermal insulation.

Here, for example, the specified heat loss limit value can correspond to the heat loss that can be achieved with the double-walled and thermally insulated pipeline elements currently conventionally used. A suitable, water-permeable segment bedding material can be, for example, a sand material mixed with suitable aggregates, wherein the thermal conductivity of the bedding material is reduced by the aggregates and thus the thermally insulating properties of the bedding material are improved. Consequently, the segment bedding material not only assumes the function of a mechanical protective cover around the pipeline element laid in the trench, but also provides efficient thermal insulation of the pipeline element and reduces the heat loss of the heat transfer fluid transferred in the pipeline portion.

Depending on the segment bedding material used in each individual case and in each individual segment, it may be possible or even advantageous if the trench is backfilled exclusively with the segment bedding material concerned, i.e. the backfill material corresponds to the segment bedding material. The use of different materials is not necessary. On the contrary, it may be provided to backfill the trench completely with the segment bedding material if, for example, the additional cost incurred for the use of different materials is greater than the additional cost of the segment bedding material as compared to a backfill material deviating therefrom.

According to one embodiment, it is provided that, in the segmentation step, a division of the pipeline portion into several segments is made on the basis of at least one soil physical parameter describing the soil water balance. Such a soil physical parameter describing the soil water balance can be, for example, the saturation of the soil with soil water, the permeability of the soil for percolating soil water or soil water rising from the subsoil, or the suction stress-water content relationship or rather the suction stress of the pore water in the soil. The heat loss caused by convection of moisture and in particular of pore water represents a significant proportion of the total heat loss occurring during the transfer of the heat transfer fluid in the buried pipeline portion. The soil physical parameters describing the soil water balance are considered to be particularly important parameters for the division of the pipeline portion into individual segments and the specification of a suitable segment bedding material for the individual segments.

According to an advantageous embodiment, in order to reduce the effort for obtaining and placing the segment bedding material in the individual segments concerned, it is provided that the segment bedding material of at least one segment comprises a portion of trench segment material which was excavated within the segment concerned during the excavation of the trench. In this way, a portion of the segment bedding material, for example a fine-grain fraction of the trench segment material excavated during the excavation of the trench, produced by screening, can be provided on site without the need to transport large quantities of material over relatively large distances. The relevant portion of trench segment material can be prepared and thermally conditioned by suitable aggregates in order to exert a sufficient thermally insulating effect on the pipeline element encased with the prepared trench segment material in the subsequent use as segment bedding material.

It is also conceivable that the segment bedding material is produced starting from a standardised bedding material which initially substantially satisfies the mechanical requirements for reliable embedding and low stress on the pipeline. This can be, for example, a suitable sand material that is already used in the conventional embedding of pipelines in excavated trenches. The standardised bedding material can be thermally conditioned for each individual segment by adding or admixing suitable aggregates and can be equipped with the thermal insulation properties required for the thermal insulation of the pipeline in the segment concerned.

In order to enable the pipeline portion to be constructed as cost-effectively as possible, it is provided in accordance with one embodiment that the pipeline segment is provided in at least one segment as a coiled bundle and is unwound from a transport reel and introduced into the excavated trench. By using pipeline segments which can have a large length of, for example, 50 m, 100 m or more than 250 m and can be rolled up in a space-saving manner onto a transport reel, transported and kept ready on site, the production and processing costs of the pipeline can be significantly reduced. It is also possible for the pipeline segment unwound from the transport reel to be pulled into the trench by means of a pipe-laying plough, for example. By using comparatively long pipeline elements, the number of joints between adjacent pipeline elements is significantly reduced, resulting in less time-consuming and cost-intensive welding work for the fluid-tight connection of adjoining pipeline elements.

In an advantageous manner, it is optionally provided that a plastics pipe segment with a length-unit-related pipeline heat loss is introduced into the excavated trench as a pipeline segment, wherein the pipeline heat loss is higher than the specified heat loss limit value. Therefore, in order not to exceed the specified heat loss limit value, it is necessary that the segment bedding material surrounding the pipeline segment contributes significantly and possibly substantially to the thermal insulation of the pipeline segment in the trench. If the pipeline heat loss is comparatively low and only slightly exceeds the specified heat loss limit value, the segment bedding material surrounding the pipeline segment can have a comparatively low thermally insulating effect and can be produced comparatively cost-effectively from conventional bedding materials, such as a fine-grain sand material, but possibly also from a coarse-grain trench material or earth material or from a trench material or earth material having another consistency. If, on the other hand, a plastics pipe segment with a comparatively high pipeline heat loss is used, the surrounding segment bedding material must make a large and possibly substantial contribution to the thermal insulation of the pipeline segment in the trench and must have the thermally insulating properties required for this. For this purpose, the plastics pipe segment used can be configured very cost-effectively. In many cases, a suitable selection and specification of the plastics pipe segment in combination with the surrounding segment bedding material can ensure that the individual components are very cost-effectively produced and used for the construction of the pipeline segment in the segment concerned.

According to a particularly advantageous embodiment, it is provided that the pipeline segment which is introduced into the excavated trench is not a double-walled pipe but a single-walled pipe, preferably a single-walled pipe made of polyethylene. A single-walled pipe made of polyethylene, which is not surrounded by an additional thermally insulating foam material or the like, can be particularly cost-effectively produced and transported to the trench as a coiled bundle and embedded therein. Single-walled polyethylene pipes are commercially available in various diameters and wall thicknesses and are therefore obtainable very cost-effectively. Various laying methods which can be carried out comparatively quickly and cost-effectively are known for introducing a single-walled plastics pipe into an excavated trench. A pipeline segment made of polyethylene has a high resistance to the temperatures and temperature gradients occurring in a district heating pipeline network as well as to the mechanical stresses during laying and during subsequent alternating district heat transport in the soil.

By using single-walled plastics pipes made of polyethylene in combination with a suitable segment bedding material, which surrounds the pipeline segment and allows the heat loss in the pipeline segment to be lower than a specified heat loss limit value, a considerable reduction in the costs incurred for the construction of the pipeline portion within the heating network is possible as compared to a conventional construction of a comparable pipeline portion with double-walled and thermally insulated pipeline elements. Estimates suggest that a very significant cost reduction of the total costs incurred for the construction of the pipeline portion is possible.

The disclosure also relates to a pipeline portion of a pipe system in a heating network which is provided for transferring a heat transfer fluid between a heat supplier and at least one heat consumer, wherein a pipeline extending over the pipeline portion for transferring the heat transfer fluid is arranged in the pipeline portion together with a bedding material surrounding the pipeline in a lower region of a trench, which is backfilled with a backfill material in an upper region. In conventional pipeline portions of a heating network, the pipeline extending over the pipeline portion is usually uniformly configured and composed of a large number of double-walled and thermally insulated rod-shaped pipeline elements. The individual pipeline elements must be introduced into the excavated trench in a suitable manner and then connected to each other in a fluid-tight manner. The processing effort required for this is comparatively high and leads to high investment costs in the construction of the pipeline portion.

It is therefore also considered to be an object of the present disclosure to configure a pipeline portion of the aforementioned type in such a way that the pipeline portion can be produced as cost-effectively as possible and yet a specified heat loss limit value is not exceeded during the transfer of the heat transfer fluid through the pipeline portion.

This object is achieved in that the pipeline portion is divided into several segments, wherein a segment parameter, determined for each segment on the basis of at least one soil physical parameter, of two adjacent segments differs by more than a specified segment parameter difference value, and in that a first segment embedding of a first pipeline segment, introduced into the trench in a first segment, in a first water-permeable segment bedding material differs from a second segment embedding of a second pipeline segment, introduced into the trench in a second segment, in a second water-permeable segment bedding material.

The usually high investment costs for the construction of a pipeline portion within a heating network can be considerably reduced by a suitable division of the pipeline portion into several segments and by the use of a segment bedding material adapted to the segment concerned and provided cost-effectively. By using a water-permeable segment bedding material, cost-intensive provision and time-consuming embedding of the pipeline segment in a water-impermeable bedding material can be avoided.

The thermally insulating properties of the water-permeable segment bedding material used within a segment are adapted here within each segment to the soil physical properties of the surrounding soil such that the water-permeable segment bedding material provides sufficient thermal insulation for the use of the pipeline segment within a heating network and excessive heat loss during the passage of a heated heat transfer fluid can be avoided even in the case of reduced or insignificant separate thermal insulation of the pipeline segment. The segment bedding material used in each case can be adapted to the segment concerned with regard to its various properties and, in doing so, can be specified in such a way that, in addition to the mechanical properties required for embedding the pipeline segment, the thermal and hydraulic properties of the segment bedding material required for thermal insulation are also adapted in an advantageous manner, or rather the requirements in this regard are satisfied.

In this case, for example, an effective thermal conductivity, a suction stress-water content function (pF curve), a permeability for fluids as well as a heat capacity are considered to be particularly relevant thermal and hydraulic characteristics for the water-permeable segment bedding material. With regard to the mechanical properties, the compaction, solubility, strength, dimensional stability and, if applicable, rheology are considered to be important mechanical characteristics for the water-permeable segment bedding material used in each individual case. With regard to a particularly economic and ecological suitability of the heating network constructed in this way, further properties, such as the durability, the environmental behaviour as well as the recyclability of the pipeline segment as well as the surrounding segment bedding material can also be taken into account and specified or adapted in an advantageous manner.

In contrast to conventional heating networks, in which a buried pipeline portion consists substantially of a uniform thermally insulated pipeline, which is laid in a likewise uniformly specified bedding material, the division of the pipeline portion into different segments allows the respective soil physical conditions in the individual segments to be utilised advantageously and used to reduce the production effort for a thermally insulating segment bedding material and thus for sufficient thermal insulation within the segment. In the case of a soil within a segment that already has advantageous and possibly almost sufficient thermal insulation properties, only a small effort is required for a segment bedding material adapted to it. If, on the other hand, the surrounding soil is not very suitable in terms of its soil physical properties to provide sufficient thermal insulation for a pipeline segment laid therein, this thermal insulation function can be taken over and provided by a segment bedding material adapted thereto with sufficiently high thermal insulation properties.

In order to reduce the often time-consuming and cost-intensive transport of the segment bedding material from a distant production site to the excavated trench and thus to the place of use for the production or provision of the segment bedding material, it is optionally provided that the segment bedding material of at least one segment comprises a portion of trench segment material which was excavated within the segment concerned during the excavation of the trench. The segment bedding material may be produced, for example, from a processed fraction of the excavated trench segment material on site, by adding further aggregates and, where appropriate, additional compaction of the segment bedding material introduced into the trench. By using trench material excavated on site, the transport volume and the transport weight of the segment bedding material components to be additionally transported to the installation site of the pipeline segment, or to the excavated trench, can be considerably reduced. In addition, the disposal costs that would otherwise be incurred for the disposal of the excavated trench material can also be reduced.

According to a particularly advantageous embodiment, it is provided that the pipeline segment has, in at least one segment, at least one pipeline element with a length of more than 20 metres, preferably of more than 100 metres, and particularly preferably of more than 250 metres. The individual pipeline element with such a large length is preferably produced as a coiled bundle and is transported on a transport reel to the trench, or to the installation site, and is provided there on the transport reel for laying and introduction into the trench. Due to the large length of the individual pipeline elements, there are significantly fewer joints in the entire pipeline portion between adjacent pipeline elements which must be connected to each other in a fluid-tight manner using usually complex welding methods. This means that the production effort for a pipeline portion configured in this way can be further reduced.

In order to also be able to save costs in the production of the pipeline segment laid within a segment, it is provided in accordance with one embodiment that the pipeline segment comprises a plastics pipe segment with a length-unit-related pipeline heat loss higher than the specified heat loss limit value. Preferably, it is provided here that the pipeline segment comprises a single-walled plastics pipeline element, particularly preferably a single-walled plastics pipeline element made of polyethylene. Such plastics pipes and in particular single-walled plastics pipeline elements made of polyethylene are commercially available and are obtainable very cost-effectively. The cost savings possible for the procurement and laying of such advantageous plastics pipeline elements considerably exceed the additional costs required for the individual adaptation and provision of the segment bedding material in the individual segments.

In this way, a heating network composed of several pipeline portions can be produced at a considerably lower cost as compared to conventionally configured heating networks. Due to the suitable adaptation of the segment bedding material in the individual segments, which are specified depending on the soil physical conditions along the pipeline portion, even when pipeline segments that are hardly or not at all thermally insulated are used, sufficient thermal insulation can be achieved and a heat loss of the heat transfer fluid transferred in the pipeline segments below a specified heat loss limit value can be achieved, so that a heating network can be used and operated with comparable operating parameters and in particular with comparable operating costs to a conventionally constructed heating network. Under certain circumstances, it may also be an economically sensible decision in individual cases to intentionally accept a comparatively high heat loss in a segment, if significantly higher production costs for the pipeline portion concerned can be avoided as a result.

In the following, some exemplary embodiments of the inventive concept are explained in more detail and are shown in the drawings.

DETAILED DESCRIPTION

Figure 1:
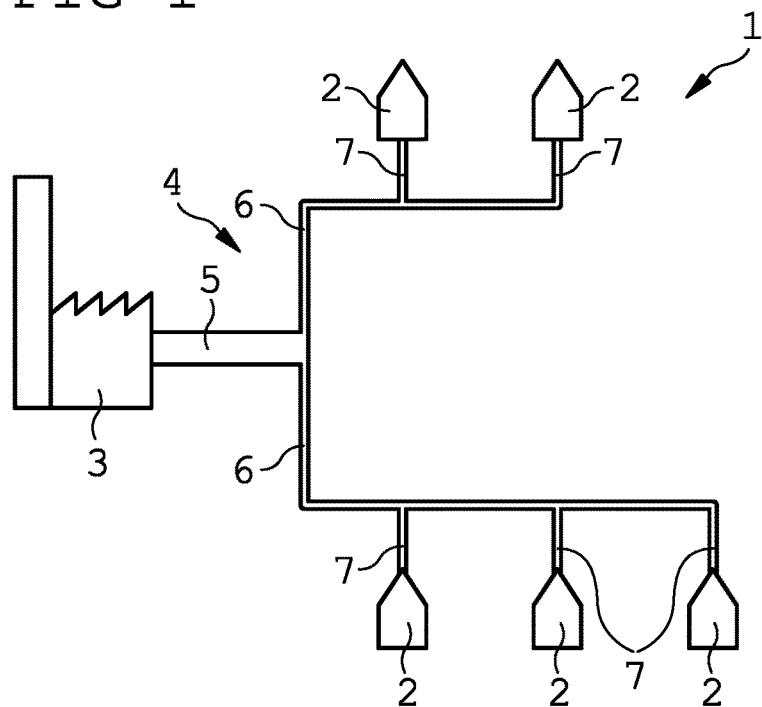
FIG. 1 shows a schematic illustration of a district heating system with a heat supplier and with several heat consumers, wherein a heat transfer fluid can be transferred from the heat supplier to the heat consumers via a heating network and can be returned to the heat supplier after heat extraction at the individual heat consumers.

FIG. 1 schematically shows a district heating system 1 for supplying several heat consumers 2 with heat energy generated by a heat supplier 3. The heat supplier 3 can be, for example, a combined heat and power plant or a waste incineration plant or other industrial plant in which usable waste heat is generated and can be used for heating a heat transfer fluid. The heat transfer fluid to which heat energy is supplied is transferred from the heat supplier 3 via a heating network 4 to the individual heat consumers 2 and is returned to the heat supplier 3 after each heat consumer 2 has possibly individually removed heat energy, so that a circuit is formed for the heat transfer fluid.

The heating network 4 has several pipeline portions 5, 6, 7. The individual pipeline portions 5, 6, 7 of the heating network 4 can be divided, or rather assigned to a transport network usually connected to the heat supplier 3, to a distribution network connected thereto and to individual heat consumer connections from the distribution network. In particular for pipeline portions 5, 6 within the transport network and the distribution network, a division of the pipeline portions 5, 6 concerned into individual segments is suitable.

Figure 2:
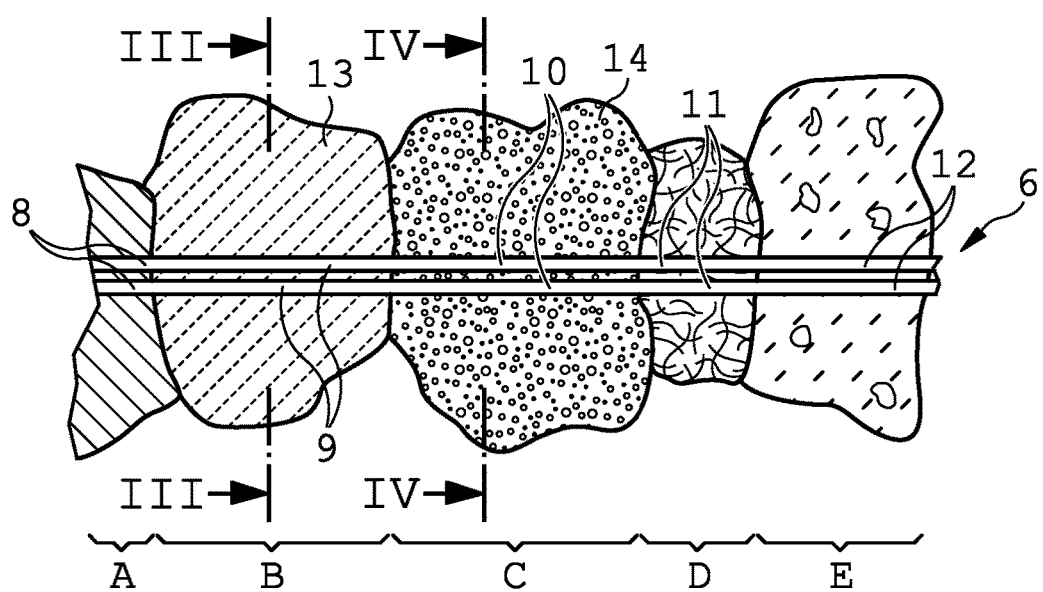
FIG. 2 shows a schematic illustration of a pipeline portion within the heating network, wherein the pipeline portion is divided into several segments, wherein adjacent segments are distinguished by the soil physical properties of the soil surrounding the pipeline portion.

FIG. 2 schematically shows a pipeline portion 6 within the distribution network of the heating network 4, wherein the pipeline portion 6 has two pipelines, laid in parallel, for the supply and return of the heat transfer fluid. Soil physical parameters for the surrounding soil have been determined by previous investigations. On the basis of the soil physical parameters, such as a suction stress-water content relationship or a permeability for fluids, the pipeline portion 6 is divided in a segmentation step into several segments A, B, C, D and E, wherein a segment parameter is determined for each segment A to E on the basis of at least one of the determined soil physical parameters, and the determined segment parameters of two adjacent segments A to E differ by more than a specified segment parameter difference value. In this way, the pipeline portion 6 is divided into several segments A to E, in which approximately uniform soil physical properties of the surrounding soil are present within each of the segments A to E concerned, while the soil physical properties of the surrounding soil of two adjacent segments A to E differ sufficiently clearly, or by more than a specified segment parameter difference value.

The length of the individual segments A to E can vary here depending on the surrounding soil along the pipeline portion 6. It has been shown that, with regard to a cost-effective construction of the pipeline portion 6, advantageous lengths of the individual segments A to E can vary between less than 50 metres or 100 metres on the one hand and possibly several kilometres on the other.

For each segment A to E, a water-permeable segment bedding material is specified in a bedding determination step in such a way that, within the segment A to E, a length-unit-related heat loss, averaged over the segment A to E, of the pipeline segment 8, 9, 10, 11, 12 laid in the respective segments A to E and a length-unit-related heat loss, averaged over the segment A to E, of the heat transfer fluid transferred in the pipeline segment 8, 9, 10, 11, 12 concerned is less than a specified heat loss limit value.

Figure 3:
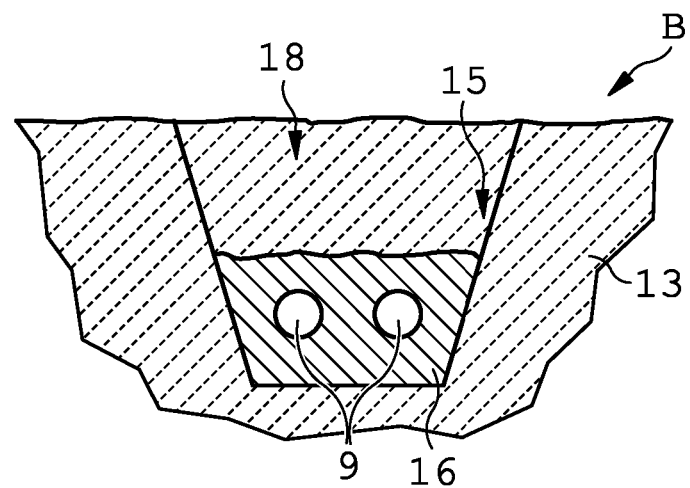
FIG. 3 shows a sectional view of a pipeline segment laid in a trench and embedded in a surrounding segment bedding material along a line III-III in FIG. 2.
Figure 4:
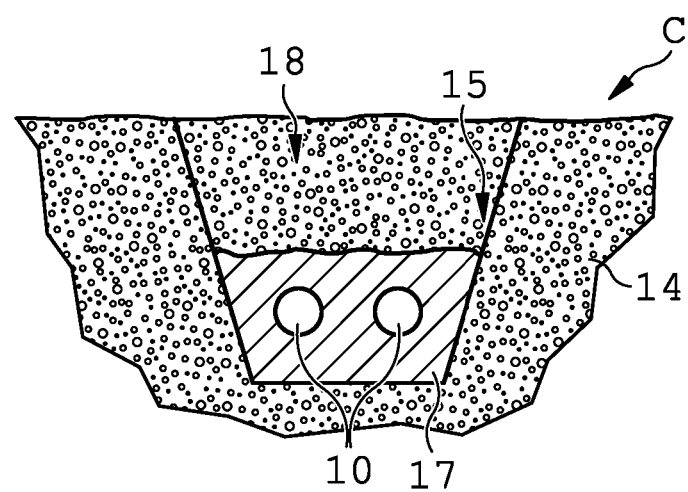
FIG. 4 shows a sectional view along a line IV-IV in FIG. 2 of an adjacent segment with a pipeline segment laid in a trench and surrounded by a segment bedding material different from that shown in FIG. 3.

FIGS. 3 and 4 show two exemplary sectional views along the pipeline portion 6 shown in FIG. 2. In order to lay the pipeline segments 9, 10 shown by way of example in FIGS. 3 and 4, a trench 15 is first excavated in the soil 13, 14. The pipeline segment 9 is introduced into the trench 15 in the segment B shown schematically in FIG. 3 and is surrounded by a segment bedding material 16 adapted to the segment B. Similarly, in the segment C shown in FIG. 4, the pipeline segment 10 concerned is embedded in a segment bedding material 17 adapted to the segment C, wherein this segment bedding material 17 differs from the segment bedding material 16 introduced in segment B in terms of its thermal and hydrological properties. Subsequently, the remaining trench regions 18 not filled with the particular segment bedding material 16, 17 are backfilled with the previously excavated soil 13, 14 in each case.

The pipeline segments 8, 9, 10, 11, 12 laid within the segments A to E are each single-walled plastics pipeline elements made of polyethylene, which have only low thermal insulation properties for a heat transfer fluid circulating through the pipeline segments 8, 9, 10, 11, 12 concerned. Consequently, the heat loss is caused substantially by the segment bedding material 16, 17 surrounding the pipeline segments 8, 9, 10, 11, 12. For this purpose, the segment bedding material 16, 17 used in the respective segments A to E is adapted to the soil physical properties of the surrounding soil 13, 14, in order to nevertheless bring about the best possible thermal insulation and thus the lowest possible heat loss for the heat transfer fluid transferred through the pipeline segments 8, 9, 10, 11, 12 in the pipeline portion 6 with the lowest possible production effort for the segment bedding material 16, 17 concerned.

The invention claimed is:

1. A method for constructing a pipeline portion (5, 6, 7) of a pipe system in a heating network (4) which is provided for transferring a heat transfer fluid between a heat supplier (3) and at least one heat consumer (2), comprising:
    excavating a trench (15) extending over the pipeline portion (5, 6, 7);
    introducing a pipeline extending over the pipeline portion (5, 6, 7) for transferring the heat transfer fluid along the pipeline portion (5, 6, 7) into the trench (15);
    embedding the pipeline in a bedding material surrounding the pipeline;
    backfilling the trench (15) with a backfill material;
    dividing, in a segmentation step, the pipeline portion (5, 6, 7) into several segments (A, B, C, D, E);
    determining a segment parameter for each segment (A, B, C, D, E) based on at least one soil physical parameter wherein the determined segment parameters of two adjacent segments (A, B, C, D, E) differ by more than a specified segment parameter difference value; and
    specifying, in a bedding determination step, for each segment (A, B, C, D, E) a segment embedding of a pipeline segment (8, 9, 10, 11, 12) introduced into the trench (15) in this segment (A, B, C, D, E) in a water-permeable segment bedding material (16, 17) such that, within the segment (A, B, C, D, E), a length-unit-related heat loss, averaged over the segment (A, B, C, D, E), of the heat transfer fluid transferred in the pipeline segment (8, 9, 10, 11, 12) is less than a specified heat loss limit value.

2. The method according to claim 1, wherein, in the segmentation step, a division of the pipeline portion (5, 6,7) into several segments (A, B, C, D, E) is made based on at least one soil physical parameter describing a soil water balance.

3. The method according to claim 1, wherein the segment bedding material of at least one segment (A, B, C, D, E) comprises a portion of trench segment material which was excavated within the segment (A, B, C, D, E) concerned during excavation of the trench (15).

4. The method according to claim 1, wherein the pipeline segment (8, 9, 10, 11, 12) is provided in at least one segment (A, B, C, D, E) as a coiled bundle and is unwound from a transport reel and introduced into the excavated trench (15).

5. The method according to claim 1, wherein a plastics pipe segment with a length-unit-related pipeline heat loss is introduced into the excavated trench (15) as a pipeline segment (8, 9, 10, 11, 12), wherein a pipeline heat loss is higher than the specified heat loss limit value.

6. The method according to claim 1,
wherein the pipeline segment (8, 9, 10, 11, 12) which is introduced into the excavated trench (15) is not a double-walled pipe but a single-walled pipe made of polyethylene.

7. A pipeline portion (5, 6, 7) of a pipe system in a heating network (4) which is provided for transferring a heat transfer fluid between a heat supplier (3) and at least one heat consumer (4),
wherein a pipeline extending over the pipeline portion (5, 6, 7) for transferring the heat transfer fluid is arranged in the pipeline portion (5, 6, 7) together with a bedding material surrounding the pipeline in a lower region of a trench (15), which is backfilled with a backfill material in an upper region (18),
wherein the pipeline portion (5, 6, 7) is divided into several segments (A, B, C, D, E) along the pipeline portion (5, 6, 7),
wherein a soil thermal conductivity, determined for each segment (A, B, C, D, E) based on a soil water balance, of two adjacent segments (A, B, C, D, E) differs by more than a specified soil thermal conductivity difference value,
wherein a first pipeline heat loss caused by the soil thermal conductivity in a first pipeline segment is greater than a second pipeline heat loss caused by the soil thermal conductivity in a second pipeline segment, and
wherein a first segment embedding of the first pipeline segment (8, 9, 10, 11, 12), introduced into the trench (15) in a first segment (A, B, C, D, E), in a first water-permeable segment bedding material (16, 17) has a lower thermal conductivity than a second segment embedding of a second pipeline segment (8, 9, 10, 11, 12), introduced into the trench (15) in the second segment (A, B, C, D, E), in a second water-permeable segment bedding material (16, 17).

8. The pipeline portion (5, 6, 7) according to claim 7,
wherein the first water-permeable segment bedding material (16, 17) comprises a portion of trench segment material which was excavated within the first segment (A, B, C, D, E) during the excavation of the trench (15).

9. The pipeline portion (5, 6, 7) according to claim 7,
wherein the pipeline segment (8, 9, 10, 11, 12) has, in at least one segment (A, B, C, D, E), at least one pipeline element with a length of more than 100 metres.

10. The pipeline portion (5, 6, 7) according to claim 7,
wherein the pipeline segment (8, 9, 10, 11, 12) comprises a plastics pipe segment with a length-unit-related pipeline heat loss higher than a specified heat loss limit value.

11. The pipeline portion (5, 6, 7) according to claim 7,
wherein the pipeline segment (8, 9, 10, 11, 12) comprises a single-walled plastics pipeline element made of polyethylene.

12. The pipeline portion (5, 6, 7) according to claim 7,
wherein the soil water balance is a saturation of the soil with soil, a permeability of the soil for percolating soil water or soil water rising from a subsoil, or a suction stress-water content relationship, or a suction stress of pore water in the soil.

13. The pipeline portion (5, 6, 7) according to claim 7,
wherein the first water-permeable segment bedding material is selected such that a length-unit-related heat loss, averaged over the first segment, of the heat transfer fluid transferred in the first pipeline segment is less than a specified heat loss limit value, and
wherein the second water-permeable segment bedding material is selected such that a length-unit-related heat loss, averaged over the second segment, of the heat transfer fluid transferred in the second pipeline segment is less than the specified heat loss limit value.

* * * * *